United States Patent Office
3,488,335
Patented Jan. 6, 1970

3,488,335
HETEROCYCLIC FLUORINE CONTAINING COMPOUNDS AND POLYMERS THEREOF
Robert A. Braun, Newark, Del., assignor to E. I. du Pont de Nemours and Company, Wilmington, Del., a corporation of Delaware
No Drawing. Filed Mar. 11, 1964, Ser. No. 351,193
Int. Cl. C08f 19/10, 7/12; C07d 13/04
U.S. Cl. 260—88.3    2 Claims This invention relates to heterocyclic fluorine-containing compounds. It is more particularly directed to such compounds having the structure (1)
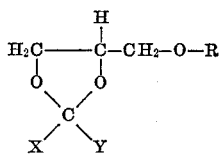

where:

X and Y can be perfluoroalkyl or perchlorofluoroalkyl, both of 1 through 5 carbon atoms; and
R can be hydrogen, vinyl, a monoethylenically unsaturated monoacyl radical of 1 through 12 carbon atoms (total) or a monoethylenically unsaturated diacyl radical of 1 through 6 carbon atoms (total).

The mono- or diacyl radicals in the R position can be any which contain a polymerizable double bond. Illustrative of such radicals are

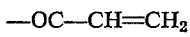—OC—CH=CH$_2$

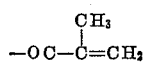
$$-OC-\underset{CH_3}{C}=CH_2$$

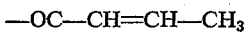—OC—CH=CH—CH$_3$

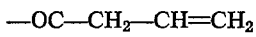—OC—CH$_2$—CH=CH$_2$

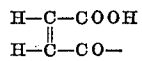
$$\begin{array}{l}H-C-COOH\\H-\underset{\parallel}{C}-CO-\end{array}$$

and

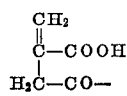
$$\begin{array}{l}\underset{\parallel}{C}H_2\\C-COOH\\H_2C-CO-\end{array}$$

Illustrative of the perchloro-fluoroalkyl radicals in the X and Y positions are

—CF$_2$Cl

—CCl$_2$F and

—CF$_2$CF$_2$Cl

This invention is also directed to:
(A) polymers of Formula 1 compounds, where R is a monoethylenically unsaturated mono- or diacyl radical, having like units (homopolymers);
(B) copolymers containing unlike monomer units (the monomers still being within the scope of Formula 1); and
(C) copolymers of Formula 1 compounds with other ethylenically unsaturated monomers.

The homopolymers of Formula 1 compounds where R is a monoethylenically unsaturated mono- or diacyl radical (A above) have recurring units of the formula (2)
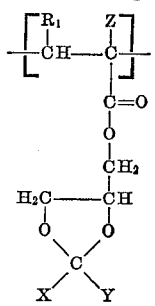

where
R$_1$ can be hydrogen or

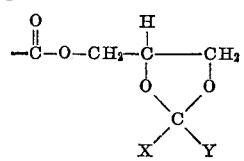

Z can be hydrogen, alkyl of 1 through 5 carbon atoms or

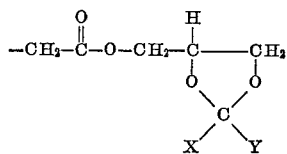

and

X and Y are as defined in Formula 1.

When R in Formula 1 is vinyl, the homopolymer has recurring units of the structure (3)
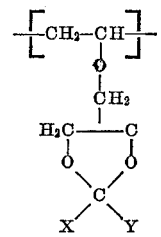

where X and Y are defined as in Formula 1.

The copolymers of (B) above have recurring units which are the same as those of Formulae 2 and 3. The recurring units are, of course, unlike and can be arranged in a random or ordered fashion.

The copolymers of (C) above have the structure (4)
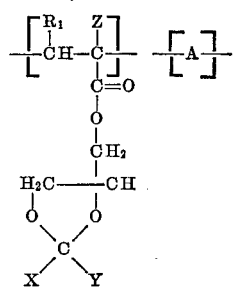

or (5)

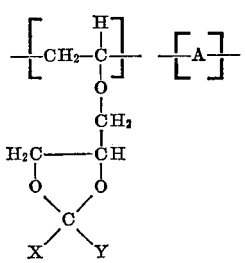

where $R_1$, Z, X and Y are as defined in Formula 2 and A is a monoethylenically unsaturated monomer unit. The units in these copolymers can also be arranged in a random or ordered manner.

Illustrative of other ethylenically unsaturated monomers which can be copolymerized with Formula 1 compounds to give the polymers of Formulae 4 and 5 are vinyl halides such as vinyl chloride and vinyl bromide; vinylidene chloride; vinyl esters of carboxylic acids such as vinyl acetate, vinyl propionate, vinyl butyrate and vinyl benzoate; esters of ethylenically unsaturated acids such as methyl acrylate, ethyl acrylate, butyl acrylate, allyl acrylate and the corresponding esters of methacrylic and ethacrylic acids; vinyl aromatic compounds such as styrene, divinyl benzene, o-chlorostyrene, p-ethylstyrene and vinyl naphthalene; vinyl ethers such as vinyl methyl ether; dienes such as butadiene; acrylamide and N-substituted acrylamides such as N-methylacrylamide; and acrylonitrile.

UTILITY

The compounds of Formula 1 where R is hydrogen are, generally speaking, thermally stable, colorless, high boiling liquids which are solvents for acrylic resins and are therefore useful in preparing coating compositions from such resins.

These componds are also useful as starting materials in classical esterification, transesterification and vinylation reactions and can be used in this way to introduce fluorine groups into thermoplastic resins.

The compounds of Formula 1 where R is hydrogen can be considered primary alcohols and will undergo reactions typical of such alcohols. For example, they will react with carboxylic acids to form the corresponding esters. Their hydroxyl groups can also be replaced by halogens to form the corresponding halides.

As already mentioned, the componds of Formula 1 where R is vinyl or a monoethylenically unsaturated mono- or diacyl radical are monomers which can be polymerized to form homopolymers and copolymers, and copolymers with other ethylenically unsaturated monomers. Those homo- and copolymers which contain fluorine atoms in their molecules are much more inert than their fluorine-lacking counterparts and are also hydrophobic.

Coating compositions can be prepared from these homopolymers and copolymers by dissolving suitable amounts of polymers in conventional solvents such as esters, ketones, or liquid hydrocarbons. Flims can be cast from these compositions by dipping or coating them on the material to be coated and then evaporating the solvent. If desired, pigments and the like can be included in the compositions. The nature of these adjuncts is largely a matter of choice.

Preferred for this use because of the ease with which they can be made are Formula 1 compounds where X and Y are —$CF_3$ and R is —$CH=CH_2$,

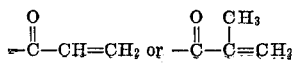

PREPARATION OF THE COMPOUNDS OF THE INVENTION

The compounds of Formula 1 where R is hydrogen can be prepared by reacting glycidol with a perhaloketone according to the equation (6)

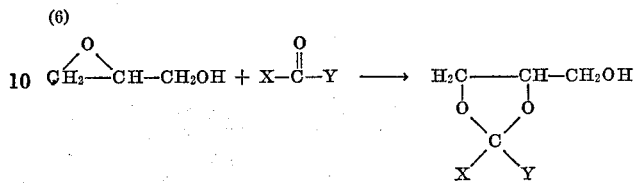

where X and Y are as defined in Formula 1.

The perhaloketone reactants can be made by procedures described in U.S. Patent 2,853,524.

The reaction is carried out by admixing glycidol and a suitable ketone in stoichiometric proportions. It is exothermic and can be controlled by running it at a temperature of from —30 to 25° C., preferably 0° C. To help control the reaction, it can be run in such solvents as volatile ethers or low boiling hydrocarbons.

The reaction is complete in from one to six hours. The product can be obtained by stripping the solvent from the reaction mass at a temperature below 25° C. This gives a substantially pure product which can, if desired, be further purified by redistillation at reduced pressure.

The compounds of Formula 1 where R is other than hydrogen can be prepared from this alcohol product and a suitable monoethylenically unsaturated organic mono- or dicarboxylic acid according to classic etherification or transesterification reactions, conducted under the customary conditions, using techniques well known in the art. Compounds of Formula 1 where R is vinyl can be made using the vinylation technique described in greater detail in U.S. Patent 2,760,990.

PREPARATION OF POLYMERS

The compounds of Formula 1 where R is a monoethylenically unsaturated mono- or diacyl radical can be homopolymerized, copolymerized with one another or copolymerized with other ethylenically unsaturated monomers by methods customarily used to polymerize vinyl and acrylic type monomers. For example, polymerization can be carried out in bulk, solution, suspension or emulsion, using such well-known catalysts as benzoyl peroxide, tertiary butyl hydroperoxide and the like. The polymers can be recovered by such known procedures as precipitation or evaporation.

The following examples illustrate the invention in greater detail.

Example 1

At 5 to 10° C., tetrafluorodichloroacetone (4 parts) was added to a solution of glycidol (14.8 parts) in 50 parts of anhydrous ether. After stirring under nitrogen for one hour at 5 to 10° C., the solvent and excess ketone were removed by stripping at 45°/0.1 mm. The product was a colorless, slightly viscous, water insoluble, essentially pure liquid having the structure

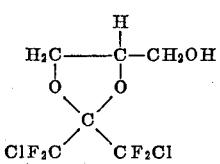

Fractionation gave only a single fraction, B.P. 72–73° C./0.5 mm.

The following perhalo ketones can be substituted for tetrafluorodichloroacetone in this scheme to give the corresponding compounds of the invention:

| | Parts |
|---|---|
| Fluoropentachloroacetone | 50 |
| 1,1,1,trifluoro 3,3,3-trichloroacetone | 44 |
| 1,1,dichlorotetrafluoroacetone | 50 |
| Perfluoroheptanone-4 | 76 |

Example 2

A mixture of 63 parts of 2,2-bistrifluoromethyl-4-hydroxymethyl-1,3-dioxolane prepared by a procedure similar to that in Example 1, 150 parts of inhibited methyl methacrylate and 0.3 part of hydroquinone was heated in a flask arranged for distillation. After collecting and discarding 5 parts of distillate, lithium methoxide prepared by adding 0.5 part of lithium hydride to 10 parts of methanol was added. Distillation was continued until the distillate contained no more alcohol (as determined by the ceric nitrate test for hydroxy groups). The residue was fractionated at 0.5 mm. of pressure to give a colorless oil, B.P. 71° C./0.5 mm., having the structure

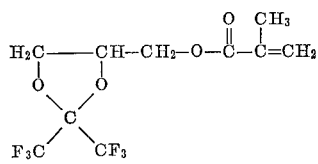

In this preparation, 150 parts of ethyl acrylate, 238 parts of dimethyl itaconate or 216 parts of diethyl maleate can be substituted for methyl methacrylate to give the corresponding compounds of the invention.

In place of the 2,2-bistrifluoromethyl-4-hydroxymethyl-1,3-dioxolane the following can be substituted to give the corresponding compounds of the invention:

| | Parts |
|---|---|
| 2,2-bischlorodifluoromethyl - 4 - hydroxymethyl-1,3-dioxolane | 71.9 |
| 2,2-bisperfluoropropyl - 4 - hydroxymethyl-1,3-dioxolane | 116.0 |
| 2-dichlorofluoro - 2 - chlorodifluoro - 4 - hydroxymethyl-1,3-dioxolane | 73.7 |

Example 3

A mixture of 121 parts of 2,2-bistrifluoromethyl-4-hydroxymethyl-1,3-dioxolane prepared by a procedure similar to that in Example 1, 100 parts of tetrahydrofuran and 5 parts of potassium tertiary butylate were heated at 150° C. for 10 hours under acetylene at a pressure of 2,000 p.s.i. The solvent was stripped from the reaction mixture, which was then filtered to give a substantially pure product having the structure

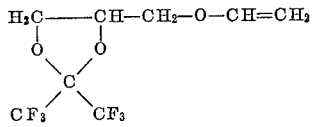

Example 4

4-[(2,2-bis(trifluoromethyl) - 1,3 - dioxolanyl)]methyl methacrylate of Example 2 or any of the other unsaturated esters disclosed above can be homopolymerized by heating a solution of 50 parts of monomer, 25 parts of acetone, 75 parts of toluene and 0.05 part of azoisobutyronitrile at 75° C. for 4 to 8 hours.

Any of the resulting polymer solutions can be used to cast films on wood or metal substrates. The films air dry to tack free coatings. Baking at 75 to 125° improves hardness and adhesion.

Example 5

A mixture of 4-[2,2,-bis(trifluoromethyl)-1,3-dioxolanyl]methylmethacrylate (13 parts), methyl methacrylate (87 parts), acetone (50 parts), toluene (100 parts) and azoisobutyronitrile (0.2 part) was heated at 75° for six hours. The resulting solution contained a polymer having the structure

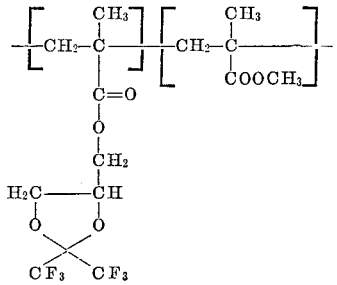

A film of this polymer solution was prepared by casting it to a Bonderite 1000 panel and baking at 80° for 1 hour. The film was more flexible and had better adhesion than polymethyl methacrylate film prepared the same way.

In this copolymer preparation, 87 parts of the itaconic acid ester of 2,2-bisperfluoropropyl-4-hydroxymethyl-1,3-dioxolane can be substituted for methyl methacrylate to produce the corresponding polymer of the invention.

Similarly, the following monomers can be used in place of methyl methacrylate to produce the corresponding polymers of the invention:

| | Parts |
|---|---|
| Styrene | 87 |
| Acrylamide | 87 |
| Butyl methacrylate | 87 |
| β-Hydroxymethyl ethyl acrylate | 87 |

What is claimed is:
1. A compound of the formula

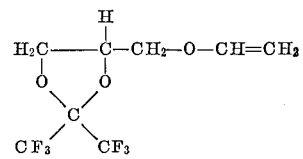

2. A homopolymer having recurring units of the structure

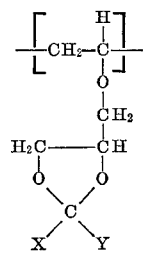

where X and Y are selected from the group consisting of perfluoroalkyl and perchloro-fluoroalkyl, both of 1 through 5 carbon atoms.

References Cited

UNITED STATES PATENTS

| 2,680,735 | 6/1954 | Fegley et al. | 260—340.9 |
| 2,925,424 | 2/1960 | Simmons | 260—340.9 |

OTHER REFERENCES

Simmons et al.: J.A.C.S., 82, pp. 2288–96 (1960).
Piantadori et al.: J. Org. Chem., 28 (9), 2425–8 (1963).

HARRY WONG, JR., Primary Examiner

U.S. Cl. X.R.

260—31.2, 32.8, 33.6, 78.4, 78.5, 80.3, 85.5, 85.7, 86.1, 87.5, 87.7, 88.1, 88.2, 340.9